United States Patent

[11] 3,568,925

[72] Inventor Arthur C. Lietzer
      50 Rhine St, San Francisco, Calif. 94112
[21] Appl. No. 751,259
[22] Filed Aug. 8, 1968
[45] Patented Mar. 9, 1971

[54] METHOD FOR PRODUCING INCREASED RAINFALL IN COASTAL REGIONS
     5 Claims, 1 Drawing Fig.
[52] U.S. Cl. .................................................. 239/2, 239/14
[51] Int. Cl. ....................................................... A01g 15/00
[50] Field of Search ............................................. 239/2, 14

[56] References Cited
     UNITED STATES PATENTS
     3,409,220  11/1968  Black ........................... 239/14(x)

OTHER REFERENCES
1. SCIENCE 13 Oct. 1958 Vol. 128 Number 3331, Modifying Weather on a Large Scale, by Wexler
2. Journal of Applied Meteorology Vol 2, No. 5, Oct. 1963, Tropical Rain Induced by a small Natural Heat Source, by Malkus Primary Examiner—Lloyd L. King
Assistant Examiner—Gene A. Church
Attorney—Townsend and Townsend ABSTRACT: A method of producing increased rainfall in coastal regions by spreading a thin layer of solar radiation absorbing material over a large surface area of the sea adjacent the coastal region to increase heat absorption at the water surface and evaporation of water when the prevailing weather direction is from the sea to the land, to thereby produce increased rainfall on the target land area.

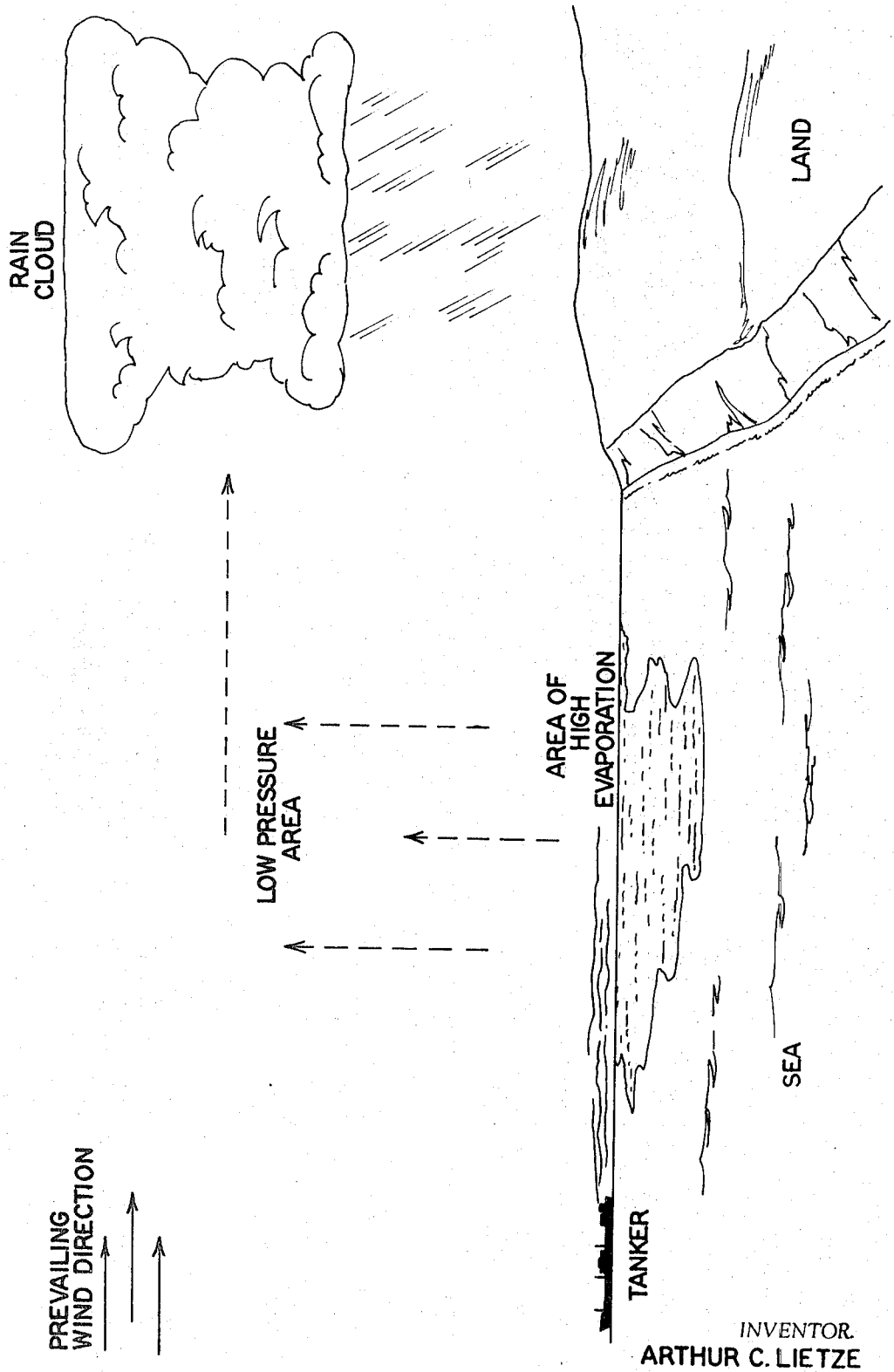

METHOD FOR PRODUCING INCREASED RAINFALL IN COASTAL REGIONS

This invention relates to a new and improved method of weather modification and, in particular, to a method of increasing rainfall in coastal regions.

Because of the pressures from a rapidly growing human population with its increased water needs, water shortages have become a problem in many parts of the world. There have been many proposals for alleviating these water shortage problems by desalinization of sea water by artificial means to increase the water supply and by improved water storage methods for preserving the supply. Such techniques, however, are generally expensive and do not take advantage of the natural forces in the hydrologic cycle. A relatively recent method in the ancient art of rain making which utilizes the natural hydrologic cycle involves various types of cloud-seeding to hasten condensation of the water in the atmosphere by means of nucleating particles. This approach, however, does not increase the volume of atmospheric water available. The present invention is directed to artificial modification of a different aspect of the natural hydrologic cycle.

It is an object of the present invention to modify the hydrologic cycle in coastal regions by increasing the evaporation of water from large areas of the sea adjacent target land areas when the prevailing weather direction is from the sea to the land.

Another object of the invention is to increase the volume of atmospheric water available for rainfall in coastal regions.

A further object of the invention is to provide a method of increasing rainfall which amplifies the natural forces involved in the hydrologic cycle.

BRIEF DESCRIPTION OF THE DRAWING

The accompanying drawing shows a local low pressure area forming a thunderstorm carried onto the land by the prevailing off-sea wind.

In order to accomplish these results, the present invention contemplates spreading a thin layer of solar radiation absorbing material over a large surface area of the sea adjacent a target coastal region to increase heat absorption at the water surface and evaporation of water when the prevailing weather direction is from the sea to the land. According to the invention advantage is taken of the normal weather condition that as a result of higher temperatures over the land than over the water during the day, a wind from sea to land is generated during the daylight hours.

One aspect of the invention contemplates using lampblack or carbonblack in the form of fine particles to be spread over a large area of the sea in order to promote absorption of solar energy. In one embodiment of the invention the carbon is dispersed over large areas of the sea by burning crude oil, oil distillation residue, or other oil products in minimum amounts of oxygen at sea. The smoke is emitted at low levels over surface of the sea with minimum turbulence so that the smoke particles settle out onto a large surface area of the sea. During sunlight hours the particles increase heat absorption at the water surface and evaporation of water thereby creating a local low pressure area. The local low pressure area tends to form a thunderstorm carried onto the land by the prevailing off-sea wind in the manner illustrated in the accompanying figure which diagrammatically shows the hydrologic cycle modified in accordance with the present invention.

In carrying out this modification of the hydrologic cycle according to the present invention, it is desirable that the solar radiation absorbing material be uniformly dispersed over a large area at the surface of the water. Over the treated area radiation from the sun which otherwise would either be absorbed below the surface or else reflected from the surface is then absorbed at the surface, so that the water at the air-water interface is warmer over the treated area than over adjacent areas.

Although lampblack or carbonblack has a density higher than water, it will float on the water surface because of water tension at the surface if the particles are sufficiently fine. The effectiveness of the water tension is supporting fine particles of carbonblack or lampblack is improved if the particles are rendered hydrophobic by a thin oily layer deposited on the particle surfaces. The thickness of the hydrophobic film formed on the particles must be minimized in order not to produce an impermeable surface over the water.

A variety of techniques may be used in dispersing the finely divided particles of solar radiation absorbing material over the sea. According to one method of dispersion, crude oil or oil distillation residue sufficiently fluid for handling is stored in an oil tanker for burning at sea. According to the invention, the crude oil or oil distillation residue is burned at night upwind from the large surface area of the sea over which the lampblack or carbonblack is to be spread. The crude oil or oil distillation residue is burned in minimum oxygen and the resulting smoke is emitted over the sea by means of smoke stacks designed to emit the smoke with minimum turbulence at low level so that the smoke particles settle out as uniformly as possible over a large surface area of the sea. The smokestacks may be arranged in an array at several levels to facilitate dispersion of the particles of lampblack or carbonblack.

In order to effectively increase evaporation of water at the water surface, it has been found that a surface density of approximately 1 gram per square meter of lampblack or carbonblack is satisfactory. Although a wide range of surface densities of lampblack or carbonblack may be used, surface densities in the range of 1 to 4 grams per square meter has been found to increase the rate of evaporation at the water surface by 30 percent to 40 percent. The increase in temperature at the air-water interface and the increasing evaporation thereby produce an artificial low pressure area carried onto the land by the prevailing weather thereby tending to produce rain which otherwise would not occur.

By means of the present invention, the mass of atmospheric water available for rain is increased. In order to hasten precipitation of the increased atmospheric water, the modification of the hydrologic cycle according to the present invention may be advantageously combined with traditional methods of cloud-seeding. Thus, water condensing nucleating particles are dispersed in the clouds formed from increased atmospheric water produced by the present invention to hasten rainfall.

Other weather modifications are also possible by means of the methods contemplated by the present invention. Thus, instead of spreading a thin layer of solar radiation absorbing material over one large surface area of the sea adjacent a coastal region, the material is spread over two spaced apart large surface areas of the sea, thereby producing two spaced apart low pressure areas. The resulting turbulent air movement between the air volumes over the first and second spaced apart large surface areas of the sea may result in thunderstorms of unusual violence and tornado conditions.

Although the present invention has been described above with reference to the use of lampblack or carbonblack, other solar radiation absorbing materials may also be used. In particular, it may be advantageous to use certain cheap industrial waste materials, provided the material is chosen and formed so that it floats, is insoluble in the water, and provides high solar radiation absorption. The solar radiation absorbing material may also be distributed or dispersed by methods other than that described above, such as, for example, the various methods used in cloud-seeding When a material such as carbonblack or lampblack is used, having a density greater than that of water, the layer of material spread over a large surface area of the sea may be eliminated by spreading a binding material across the surface area to bind the particles in aggregations which then sink to the bottom of the sea. Alternatively, as the metastable equilibrium gradually breaks down, the lampblack will fall through the surface tension of the water by itself.

The optimum size and shape of the surface area of the sea over which solar radiation absorbing material is dispersed depends upon many factors, including the weather condition. Generally, a circular area having a diameter of at least 10 miles, the area of a typical thundershower, would be required, and up to 40 miles for larger storms. In addition to circular areas, areas of other shapes, such as elongated oval shapes or pyramid shapes could also be used. For example, an elongated area 10 to 40 miles along the short dimension and 40 to 160 miles along the longitudinal dimension would be effective under various condition.

I claim:

1. A method for producing rainfall in coastal regions comprising: spreading a thin layer of solar radiation absorbing material over a large surface area of the sea adjacent the coastal region to increase heat absorption at the water surface and evaporation of water when the prevailing weather direction is from the sea to the land, said solar radiation absorbing material comprising carbonblack formed in finely divided particles supportable on the water surface by surface tension, spread with a surface density in the range 1 to 4 grams per square meter.

2. A method for producing rainfall as set forth in claim 1 comprising the additional step of seeding clouds formed by the evaporated water passing from the large surface area of the sea to the land with water condensing nucleating particles.

3. A method for producing rainfall in coastal regions comprising: burning oil products in minimum amounts of oxygen adjacent a coastal region; emitting the smoke from said burning at low levels over the surface of the sea with minimum turbulence so that the smoke particles settle out onto a large surface area of the sea, to thereby increase heat absorption at the water surface and evaporation of water during daylight hours when the prevailing weather direction is from the sea to the land.

4. A method for producing rainfall as set forth in claim 3 wherein the burning of the oil products and the emitting of smoke are performed at night.

5. A method for producing rainfall in coastal regions comprising: spreading a thin layer of solar radiation absorbing material over a first large surface area of the sea adjacent a coastal region to increase heat absorption at the water surface and evaporation of water; spreading a thin layer of solar radiation absorbing material over a second large surface area of the sea spaced from said first large surface area a distance sufficient to create turbulent air movement between the air volumes over said first and second large surface areas of the sea upon heat absorption at the water surface and evaporation of water in the first and second large surface areas of the sea.